(12) United States Patent
Wiest et al.

(10) Patent No.: US 7,613,688 B2
(45) Date of Patent: *Nov. 3, 2009

(54) GENERATING BUSINESS WAREHOUSE REPORTS

(75) Inventors: Lorenz E. Wiest, Walldorf (DE); Kai Wachter, Dessenheim (DE); Karim Mohraz, Wieslich (DE)

(73) Assignee: SAP AG, Walldorf (DE)

( * ) Notice: Subject to any disclaimer, the term of this patent is extended or adjusted under 35 U.S.C. 154(b) by 405 days.

This patent is subject to a terminal disclaimer.

(21) Appl. No.: 11/069,143

(22) Filed: Feb. 28, 2005

(65) Prior Publication Data

US 2006/0195424 A1    Aug. 31, 2006

(51) Int. Cl.
G06F 7/00      (2006.01)
G06F 17/30     (2006.01)
(52) U.S. Cl. .................. 707/3; 707/102; 715/222
(58) Field of Classification Search .......... 707/1–10, 707/100–104.1, 200–206; 715/513, 516, 715/210, 221, 222, 234
See application file for complete search history.

(56) References Cited

U.S. PATENT DOCUMENTS

| | | | | |
|---|---|---|---|---|
| 6,141,659 A | * | 10/2000 | Barker et al. | 707/102 |
| 6,160,549 A | * | 12/2000 | Touma et al. | 715/762 |
| 6,199,077 B1 | | 3/2001 | Inala et al. | 715/501.1 |
| 6,463,428 B1 | * | 10/2002 | Lee et al. | 707/3 |
| 6,754,885 B1 | * | 6/2004 | Dardinski et al. | 717/113 |
| 6,782,003 B1 | | 8/2004 | Giroux et al. | 370/466 |
| 7,096,465 B1 | * | 8/2006 | Dardinski et al. | 717/178 |
| 2002/0078079 A1 | | 6/2002 | Rangan et al. | 715/500 |
| 2004/0117376 A1 | | 6/2004 | Lavin et al. | 707/10 |
| 2004/0254881 A1 | | 12/2004 | Kumar et al. | 705/40 |
| 2005/0234886 A1 | * | 10/2005 | Mohraz et al. | 707/3 |

OTHER PUBLICATIONS

Lehner et al., Processing reporting function views in a data warehouse environment, Feb. 26-Mar. 1, 2002, IEEE, 176-185.*
Sengupta et al., Query by templates: a generalized approach for visual query formulation for text dominated databases, May 7-9, 1997, IEEE, 36-47.*

* cited by examiner

Primary Examiner—Jean B Fleurantin
(74) Attorney, Agent, or Firm—Mintz, Levin, Cohn, Ferris, Glovsky and Popeo, P.C.

(57) ABSTRACT

Techniques for generating a report of a plurality of business warehouse system queries are described. Such techniques may identify one or more row types for each query. Thereafter, a template may be defined for each row type within a query that defines a format and a pattern for the row type. The template may be applied to query data for each query according to the row type to generate a sub-report. The sub-reports may be combined to generate an aggregated reports. Related apparatus and computer program products are also provided.

20 Claims, 12 Drawing Sheets

| Calendar year | Calendar year/Quarter | Customer | Bag & Outdoor | Accessories |
|---|---|---|---|---|
| 2000 | | | | |
| | Q1 2000 | | | |
| | | Viking Automotive Inc | 0,0413 ST | 0,3647 ST |
| | | Corvette | 0,0320 ST | 0,1880 ST |
| | | Oakville Shirt Group Inc | 0,0468 ST | 0,1080 ST |
| | | Federal Express Corporation | 0,0128 ST | 0,0841 ST |
| | | Alpha Baptist Church | 0,0522 ST | 0,2535 ST |
| | | Federal Express Corporation | 0,0649 ST | 0,2088 ST |
| | | Total | 0,2500 ST | 1,2071 ST |

FIG. 1A

Presentation-Quality Report (Example I)

| | Prev. FY actuals | FY actuals | vs. Prev FY (%) | % of Bdg. IX | vs. Prev FY (%) |
|---|---|---|---|---|---|
| Sales world | 623.000 | 708.000 | 13,64% | 86,36% | 43,18% |
| Europe total | 115.000 | 165.000 | 43,48% | 56,52% | 28,26% |
| France | 10.000 | 20.000 | 100,00% | 0,00% | 0,00% |
| Germany | 50.000 | 60.000 | 20,00% | 80,00% | 40,00% |
| Spain | 5.000 | 30.000 | 500,00% | 400,00% | 200,00% |
| Switzerland | 40.000 | 15.000 | -62,50% | 162,50% | 81,25% |
| United Kingdom | 10.000 | 40.000 | 300,00% | 200,00% | 100,00% |
| Americas total | 422.000 | 441.000 | 4,50% | 95,50% | 47,75% |
| Argentina | 30.000 | 10.000 | -66,67% | 166,67% | 83,33% |
| Brazil | 7.000 | 15.000 | 114,29% | 14,29% | 7,14% |
| Canada | 15.000 | 10.000 | -33,33% | 133,33% | 66,67% |
| Mexico | 20.000 | 6.000 | -70,00% | 170,00% | 85,00% |
| USA | 350.000 | 400.000 | 14,29% | 85,71% | 42,86% |
| Asia total | 61.000 | 57.000 | -6,56% | 106,56% | 53,28% |
| Australia | 4.000 | 7.000 | 75,00% | 25,00% | 12,50% |
| China | 17.000 | 30.000 | 76,47% | 23,53% | 11,76% |
| Japan | 30.000 | 10.000 | -66,67% | 166,67% | 83,33% |
| Singapore | 5.000 | 3.000 | -40,00% | 140,00% | 70,00% |
| Taiwan | 5.000 | 7.000 | 40,00% | 60,00% | 30,00% |
| Rest of World total | 25.000 | 45.000 | 80,00% | 20,00% | 10,00% |

'Formatted' BW report in Excel

Board Report III.12 Statement of Income (monthly)

| | OCT - FEB FY 2002 | | | FEB FY 2002 | | | | FEB - SEP | | | | | FY 2002 | FY 2002 |
|---|---|---|---|---|---|---|---|---|---|---|---|---|---|---|
| | FY actuals ytd | actuals vs. prev. FY %/l | actuals vs. BDG X %/l | FY actuals mtd | actuals mtd vs. forecast 1/12 %/l | actuals mtd vs. average prev.mo. %/l | actuals mtd vs. Bdg. 1/12 %/l | FY Forecast period to quarter | Remaining quarters latest forecast | FY Forecast period to end of year | Running rate monthly version | Running rate vs. monthly average ytd | FY latest forecast | FY BDG X |
| Incoming Orders | 1.270.083 | -34% | -10% | 210.464 | -52.036 | -21% | -26% | 280.018 | 1.599.898 | 1.879.917 | 268.560 | 14.543 | 3.150.000 | 3.400.032 |
| Sales | 1.230.932 | -21% | -20% | 212.243 | -79.424 | 383% | -31% | 448.100 | 1.820.969 | 2.269.068 | 324.153 | 77.966 | 3.500.000 | 3.669.974 |
| - Cost of Sales | -1.017.171 | 195.882 | 227.286 | -170.432 | | 41.253 | 78.459 | | | | | | | -2.986.697 |
| % of sales | -82.6% | | | -80.3% | | | | | | | | | | -81.4% |
| Gross profit | 213.761 | -127.906 | -70.938 | 41.811 | -10.856 | -1.177 | -15.129 | 72.035 | 346.204 | 418.239 | 59.746 | 16.996 | 632.000 | 683.277 |
| % of sales | 17.4% | | | 19.7% | | | | 16.1% | 19.0% | 18.4% | 18.4% | | 18.1% | 18.6% |
| - R&D costs | -55.589 | -4.581 | 10.090 | -11.834 | | -895 | 1.302 | | | | | | | -157.629 |
| % of sales | -4.5% | | | -5.6% | | | | | | | | | | -4.3% |
| - Marketing and selling exp. | -112.765 | -51.276 | 5.823 | -21.184 | | 1.711 | 2.534 | | | | | | | -284.612 |
| % of sales | -9.2% | | | -10.0% | | | | | | | | | | -7.8% |
| - General administration exp. | -25.986 | 81.680 | 1.688 | -9.042 | | -4.805 | -3.507 | | | | | | | -66.419 |
| % of sales | -2.1% | | | -4.3% | | | | | | | | | | -1.8% |
| ± Other operating exp./income therein: impair. Goodwill/ oth. Intang | -7.255 | -302 | -1.003 | -453 | | 1.247 | 797 | | | | | | | -15.006 |
| - Other costs | -1.497 | -1.535 | -1.226 | -1.099 | | -999 | -1.044 | | | | | | | -650 |
| EBIT | 10.668 | -103.921 | -55.566 | -1.801 | -11.717 | -4.918 | -15.048 | 29.662 | 78.671 | 108.332 | 15.476 | 13.342 | 118.000 | 158.961 |
| % of sales | 0.9% | | | -0.8% | | | | 0.6% | 4.3% | 0.4% | 4.8% | | 3.4% | 4.3% |
| therein: Change in accruals | 23.998 | 56.033 | 7.241 | -329 | | -6.411 | -3.681 | | | | | | | 40.215 |
| Goodwill Amortisation | 2.010 | 4.038 | 5.369 | 490 | | 111 | 1.162 | | | | | | | -8.062 |

106

Generated RI XML including <bind> tags (data context)

```
- <detail>
  - <section name="detail">
      <matches />
    - <rowpattern>
      - <grid>
        - <row>
          - <cell>
              <format name="style" value="Detail" css="width: 388; height: 22;" />
            - <text>
                <bind />
              </text>
            </cell>
          - <cell>
              <format name="style" value="Detail" css="width: 160; height: 22; background-color: #ff0303;" />
            - <text>
              - <bind>
                - <dims>
                    <dim type="member" chanm="0D_PH2" chavl="CURRENT" display="[Produkt].Chavl" />
                  </dims>
                </bind>
              </text>
            </cell>
          - <cell halign="right">
              <format name="style" value="Detail" css="width: 204; height: 22;" />
            - <text>
              - <bind>
                - <dims>
                    <dim chanm="21JQRYBFV62AC3X5W48GX5BPT" chavl="230GXAA18JSYHA3Q3RXZRGYVL" />
                  </dims>
                - <x>
                - <dims>
                    <dim chanm="0D_PH2" chavl="CURRENT" display="[Fakturierte Menge].Val" />
                  </dims>
                - <y>
                </bind>
              </text>
            </cell>
          - <cell halign="right">
              <format name="style" value="Detail" css="width: 198; height: 22;" />
            - <text>
```

SUB-REPORT A 910

SUB-REPORT B 920

GENERATING BUSINESS WAREHOUSE REPORTS

TECHNICAL FIELD

This subject matter described herein relates to data processing.

BACKGROUND

In conventional business warehouse systems, reports may be generated based on a single query of a business warehouse database. Such reports may be rendered according to a standard that is typically inflexible and difficult to use. Moreover, the layout and content of the reports may be limited by parameters associated with a particular data provider that has generated the data stored in the business warehouse database.

An example of a report is a table of columns and rows in which the intersection of one column and one row defines a cell that includes one object of data from a query. The format of such tables is usually predefined (e.g., lines are one color, text is another color, and the background of the cells is yet another color). Changes to such a format usually may only be made globally for the report.

A table report may be provided as a spreadsheet, such as an Excel spreadsheet for example. The format of a spreadsheet table is typically programmed for each report, thus the entire formatting is easy to lose, and must be reprogrammed for each report generated. Users may only influence formatting such as colors, font size, or font type by tools such as a Web Template Stylesheet. Web-based report layouts may typically only be changed via a table interface or XML item, which requires ABAP or Javascript programming skills.

SUMMARY

In one aspect, a computer-implemented method for generating a report of a plurality of business warehouse system queries comprises identifying one or more row types for each query, defining a template for each row type within a query, wherein the template defines a format and a pattern for the row type, applying the template to query data for each query according to the row type to generate a sub-report, and combining at least two sub-reports to generate an aggregated report.

In some variations, the method may also comprise associating each type of business warehouse system query with a category, and positioning the at least two sub-reports relative to each other based on the associated category. For example, system query categories may be prioritized so that higher priority queries are more prominently placed within an aggregate report. Additionally or in the alternative, the method may comprise reordering the sub-reports within the aggregated report or in a report designer. The reordering may be accomplished by a variety of techniques including drag and drop-type functions. Similarly, the method may comprise aligning columns within two or more of the sub-reports.

The method may also include generating a plurality of business warehouse system queries from a plurality of heterogeneous data providers. These data providers may generate information regarding a particular subject in a plurality of disparate formats which are integrated into a single format compatible with the aggregate report.

The method may provide that the pattern comprises any of a color, a text type, a font type, and an outline. In some variations, the pattern comprises a grid-based pattern.

The method may further comprise identifying one or more structural elements of the query. Such structural elements may comprise a dimension, a structure, and a hierarchy. Additionally, the method may comprise identifying combinations of structural elements, wherein the combinations of structural elements comprise any of a dimension, structure, and hierarchy. Yet further, the method may comprise extracting data from the query to identify one or more structural elements of the query comprises. In some variations, the method may further comprise associating the one or more structural elements of the query with the template, and generating the aggregated report according to the template.

The method may include rendering the aggregate report in a display, and exporting the aggregate report. The report may be exported to an intermediate format that may subsequently be exported to one of a plurality of application or printing formats as may be desired.

In another aspect, a system for generating a report of a plurality of business warehouse system queries comprises a database to store business warehouse data from a plurality of heterogeneous data providers, a report designer program, responsive to user input from an input device, to identify one or more row types for the query, define a template for each row type, wherein the template defines a format and a pattern for the row type, apply the template to query data for each query according to the row type to generate a sub-report, and combine at least two sub-reports to generate an aggregate report, and also comprising a display coupled to the report designer program, configured to display the aggregate report.

The report designer program may be configured to be delivered from a website and stored on a client computer. The report designer may be operable to use a graphical user interface to generate one or more reports.

In some variations, the template may be configured to define user-selectable formatting and layout of the report based on one or more rows and/or sub-reports. In addition or in the alternative, the report designer program may be configured to define rules for one or more data objects in the aggregate report.

Depending on the desired implementation, the report designer program may comprise one or more drag and drop functions for one or more formats to be applied to the template. Optionally, the one or more drag and drop functions may comprise any of a property box to select properties of a report rendering and a format box to represent one or more formatting objects to be applied to individual cells or rows of the report.

The report designer program may comprise XML code to represent a report template encoding scheme for rendering the report.

In another aspect, a computer program product, stored on a machine-readable medium, includes instructions operable to cause data processing apparatus to design a report of a plurality of business warehouse queries comprising for each query: identify a row type for a row or a row group in a report, define a row pattern template for each row type, identify one or more structural elements of the query, wherein the one or more structural elements comprise a dimension, a structure, and a hierarchy, associate a structural template for each of the one or more structural elements, and render a sub-report associated with the query according to one or more templates, wherein the one or more templates comprise any of the row pattern template and the structural template, and to also combine each of the sub-reports to generate an aggregated report.

The computer program product may further comprise instructions to export the rendered report and/or instructions to define the row pattern template at run-time (which may be based on row type).

Other computer program products, which may be embodied on computer readable-material, are also described. Such computer program products may include executable instructions that cause a computer system to conduct one or more of the method acts described herein.

Similarly, computer systems are also described that may include a processor and a memory coupled to the processor. The memory may encode one or more programs that cause the processor to perform one or more of the method acts described herein.

The subject matter described herein may provide one or more of the following advantages. For example, a user may use a report designer program to design page headers, report headers, and insert custom text within the business warehouse data cell for a business warehouse report. Designs may be conducted on row patterns and a metadata-level of the queries. Formats may be defined for each report cell, as well as for structures and hierarchies. Rules may be defined for dimension members in the report, and a layout for the business warehouse report may be dynamically arranged. Web-based report layouts may be designed without a knowledge of programming skills.

The subject matter described herein also enables a user to generate a single report based on a plurality of sub-reports. These sub-reports may be from heterogeneous data providers, that have, absent the techniques described herein, incompatible data formats. Data fields from all of the queries may be positioned under a single header and in some variations, columns of the various sub-reports may be aligned. Continuous page numbers may also be provided across the multiple sub-reports. Combining sub-reports from various data providers into a single report allows for a more efficient presentation and aggregation of data pertaining to a certain subject.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

These and other aspects will now be described in detail with reference to the following drawings.

FIGS. 1A-D illustrate examples of a single query report;

FIG. 7 illustrates XML code including <bind> tags and data context;

FIG. 9 illustrates an example of an aggregate report; and

Like reference symbols in the various drawings indicate like elements.

DETAILED DESCRIPTION

This document discloses a report design system and method for use in a business warehouse or collaborative enterprise environment. The system and method enable a user to dynamically format and configure a layout of a report of one or more business warehouse (business warehouse) queries.

FIG. 1A shows an example of a single query report 100 which is based on a single business warehouse database query. The single query report 100 includes a number of rows and a number of columns, in which each intersection of a row and column is a cell. Each cell includes a data object. The data object includes data that may be a number, text, or other information, such as symbols, graphics, etc. One or more rows of the single query report 100 may represent a row type. For instance, the top row of the single query report 100 includes column headers, the second row and third rows of the single query report 100 include a result related to one or more of the column headers, the fourth through ninth rows include information and represent dimension members, detail data, and the last row includes information that represents detail or result data. Each of these rows or row groups may represent a group level, for formatting in a drilldown fashion.

Each row type is assigned a row pattern. The pattern may include, without limitation, formatting of color and font, row height and width, merging or splitting of cells, background graphical pattern, etc. The pattern may be stored as a template for each row type. During runtime of a business warehouse query, the template or row pattern may be assigned to the query data associated with a single query report being generated. Accordingly, a single query report may be configured based on row types, and query data is automatically formatted according to the one or more templates to generate the customized single query report. In one implementation, row types may be identified with a single query report having a header row, at least one result row, one or more data rows, and at least one dimension to represent the dimensions. The row types may be identified with logic in the business warehouse data to indicate the type. For example, the business warehouse data may indicate the type of row for the row pattern. The logic in the business warehouse may also enable the single query report to be generated in Portable Document Format (PDF), a file format developed by Adobe Systems.

When printing the single query report, the user may choose whether or not to print a header on each page, choose to print out certain sections of the single query report, and choose to put page breaks within various sections of the single query report.

Figure 1C:

FIGS. 1B and 1C illustrate various alternative examples of a single query report. FIG. 1B shows a single query report 102 where dimension member rows may be configured to alternate shading from one row to the next, and where detail or result rows are interspersed within the dimension member rows. FIG. 1C shows another example row 104 in which rows are configurable for variable widths based on a column. The system and method for designing a single query report also supports various hierarchies and structures of business warehouse queries. FIG. 1D shows a single query report formatted and rendered as a Microsoft Excel™ spreadsheet.

Figure 2:
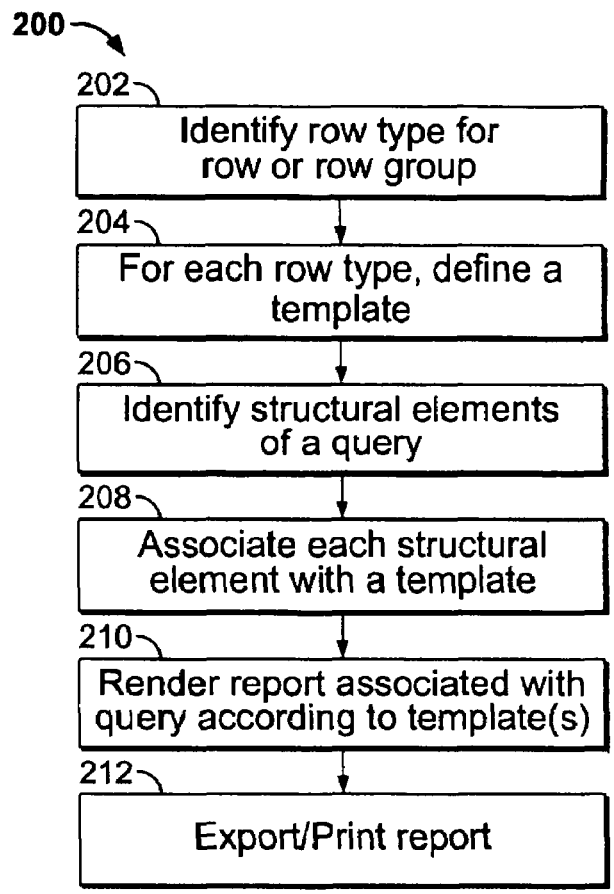
FIG. 2 illustrates a process flow diagram of a report design process.

FIG. 2 is a flowchart of a method 200 of designing a single query report. At step 202, a row type may be identified for a row or a group of rows. The group of rows may be related to the data object that will be contained in a cell within that or those rows. At step 204, for each row type a template may be defined. The template represents a pattern that may be selected for the row type. The pattern may include colors, patterning, text type, font type, outline, or other pattern. Group levels are represented by different row patterns that may be formatted separately. The pattern may be grid-based, as opposed to pixel-based, to better accommodate standard single query report applications.

Figure 6:
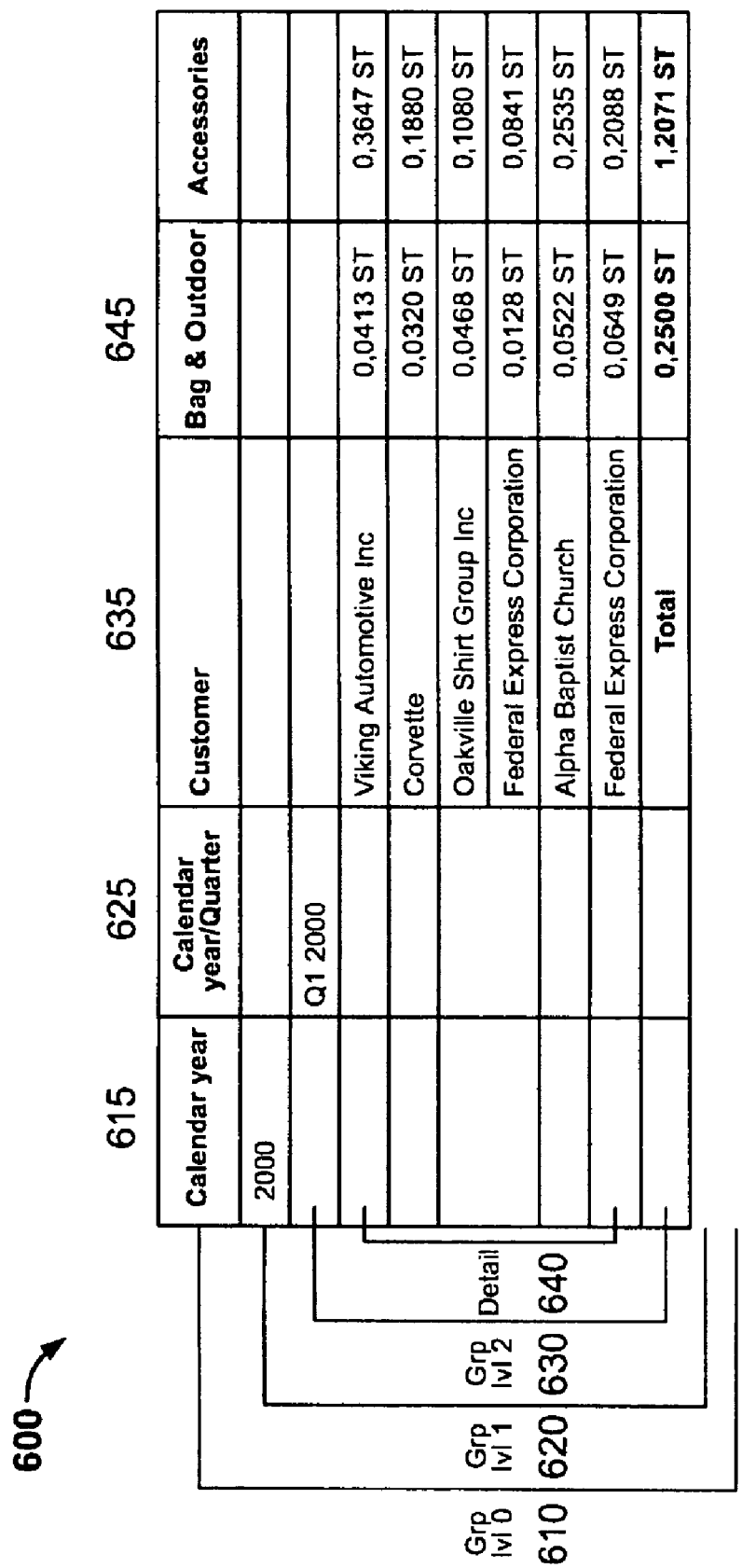
FIG. 6 illustrates group levels and corresponding query structural elements.

At step 206, the structural elements of a business warehouse query may optionally be identified. A business warehouse query is generated based on a query of the business warehouse database. The structural elements may be identified according to dimension, structure, or hierarchy, or as combinations of structural elements (e.g., dimension×dimension, hierarchy×structure×dimension, etc.). Each structural element in a query row corresponds to a group level, as shown in FIG. 6.

The business warehouse system returns a business warehouse query based on the user query to the database. The report design system extracts data from the business warehouse query to identify its structural elements. For example, objects of the business warehouse query that relate to column header information are identified as column header elements. Query metadata may be used to save data to row patterns to generate an XML representation of the pattern. At step 208, each structural element identified in the business warehouse query is associated with a template defined at step 204. At step 210, a single query report associated with the business warehouse query is rendered according to the one or more templates. The single query report may be run in a web-based application and exported to a web page. When the single query report is rendered, the patterns from step 204 are applied to data from the business warehouse server. At step 212, the rendered single query report may be exported to another program such as an application program, or printed.

Figure 3:
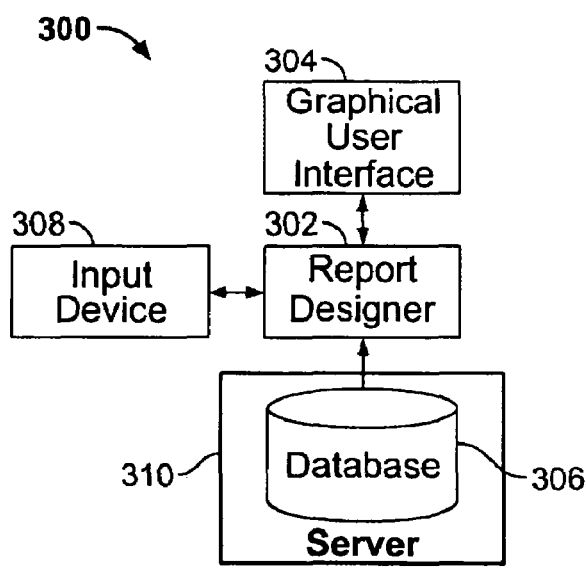
FIG. 3 illustrates a block diagram of a report designer system.

FIG. 3 illustrates a system 300 for designing both single query reports each of which are from a single business warehouse queries and aggregated reports (as described below), each of which are from two or more business warehouse queries. The system includes a report designer 302. The report designer 302 may be a computer software program implemented as an application, either web-based for delivery to a client computer, or stored locally to the client computer. The report designer 302 generates a rendering of one or more reports on a graphical user interface (GUI) 304. The GUI 304 may also be used to display a designer tool used to configure the reports. The designer tool is preferably implemented as a software program running on a client computer and responsive to command from an input device 308. The input device 308 may be connected directly to the client computer or may communicate through a wireless interface.

The report designer 302 applies templates to data extracted from a business warehouse database 306 and served to the client computer by server 310. As discussed above, the templates define the user-selectable formatting and layout of the single query report or an aggregate report based on identified rows or row groups. The rendered single query report or aggregate report may be web-based or based on an application such as Microsoft Excel. The report designer 302 may be used to define rules for the data objects to be rendered in the single query report or aggregated report, i.e. if a dimension member="France" then apply a particular format. Specific and/or global formats may be applied via "drag and drop" functions for ease of use and simplicity, and greatly increasing the efficiency of the report designer 302.

Figure 4:
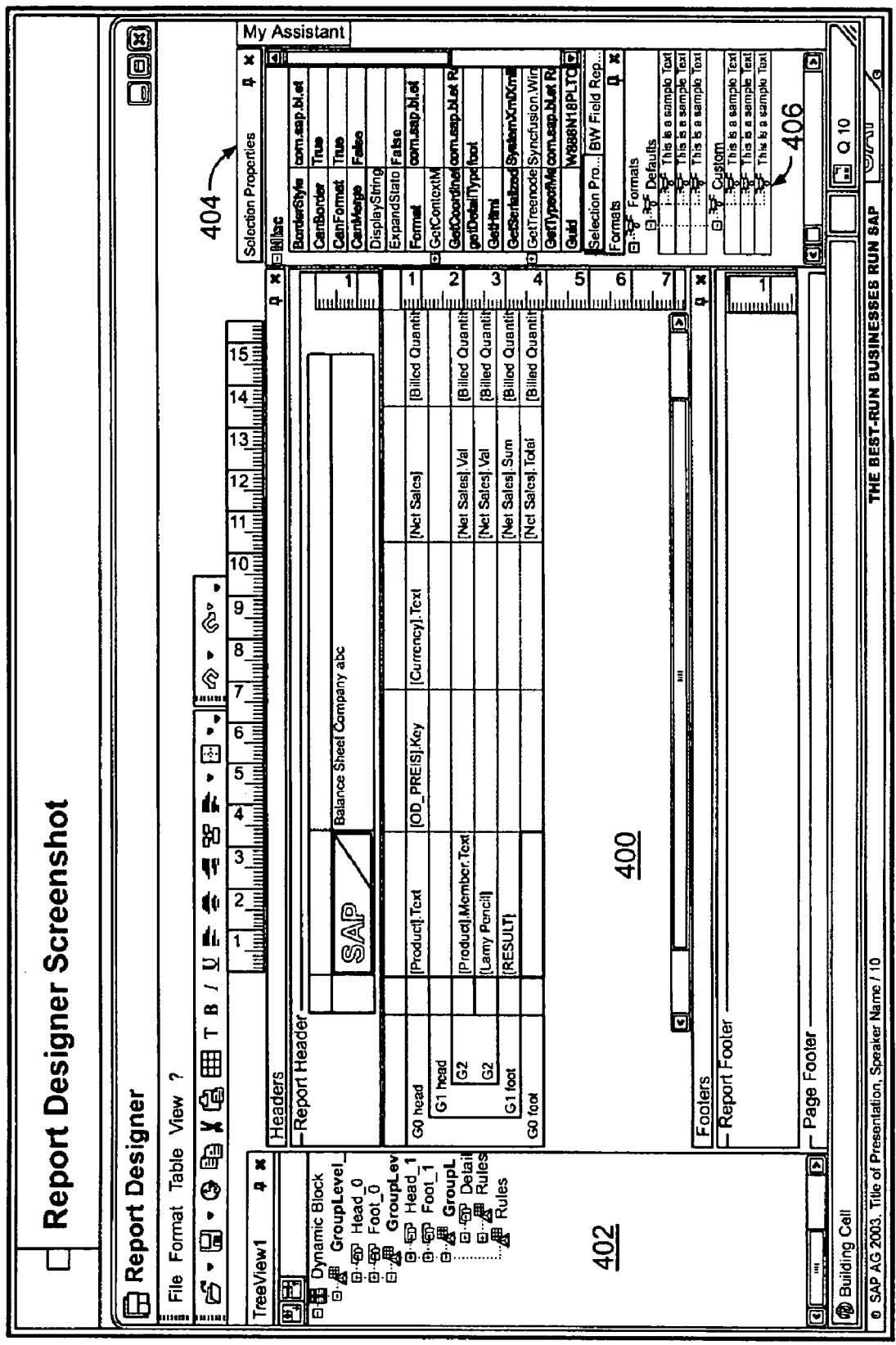
FIG. 4 illustrates a screen shot of an exemplary single query report designer tool.

FIG. 4 shows an exemplary screen shot of a report designer. The report designer includes a report template 400 that is configurable by a user to define the formatting and layout of a single query report or an aggregate report. The report designer includes a tree 402 listing all group level objects of a business warehouse query, and a properties box 404 for selection of properties of the report rendering. The properties in the properties box 404 may be applied to the report template by a "drag and drop" function. The report designer may further include a format box 406 representing the various formatting objects that may be applied to individual cells or rows of a single query report or an aggregate report. The formatting objects may also be applied to the report template using a "drag and drop" function. In one implementation, the report designer includes a field repository to recover data in fields that have been deleted.

Figure 5:
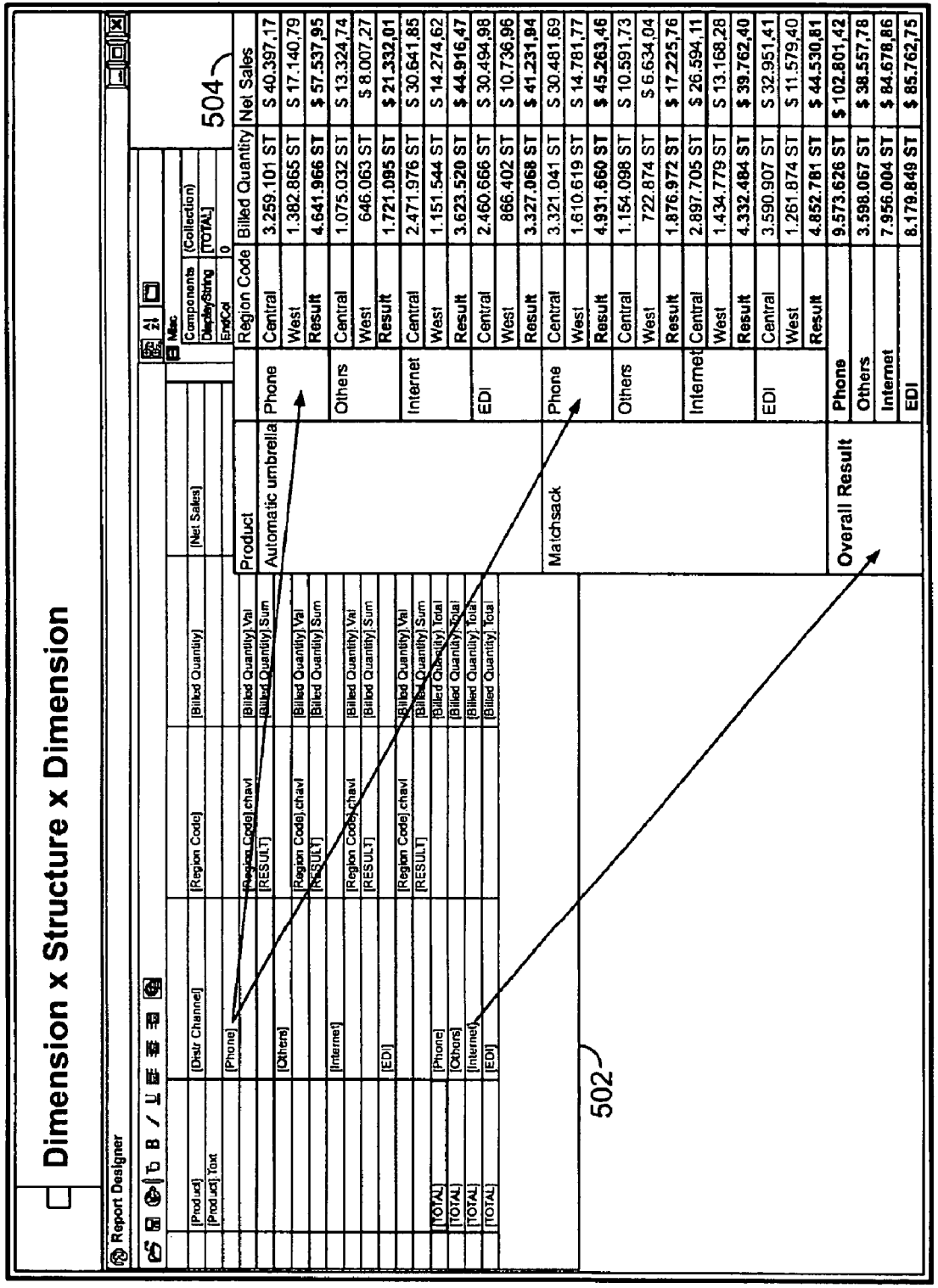
FIG. 5 illustrates an association between a single query report template and a resulting single query report.

FIG. 5 shows a report template 502 and the resulting single query report 504 that is generated. Using a system or method described herein, a user may configure a business warehouse query according to predefined templates to generate a single query report that may be printed, exported, and/or more easily interpreted.

FIG. 6 illustrates group levels and corresponding query structural elements in which data fields may be organized in groups for one or more categories. The user may drill down to various levels of detail in the single query report. For example, the user may want to view items that are grouped into a calendar year 615 in one group level 610, and then drill down into another group level 620 to view a sales quarter 625 within that calendar year 615. The user may also drill down another group level 630 for customer data 635 to further list details 640 for those customers.

FIG. 7 shows XML code including <bind> tags and data context. The XML code represents a single query report template encoding scheme for rendering a single query report with a report designer tool. The designer tool may integrate the data content into the rendered business warehouse report. The data content may include logic to facilitate the integration process. A rendering engine may generate the single query report in a particular format, such as a web page and/or in PDF.

Figure 8:
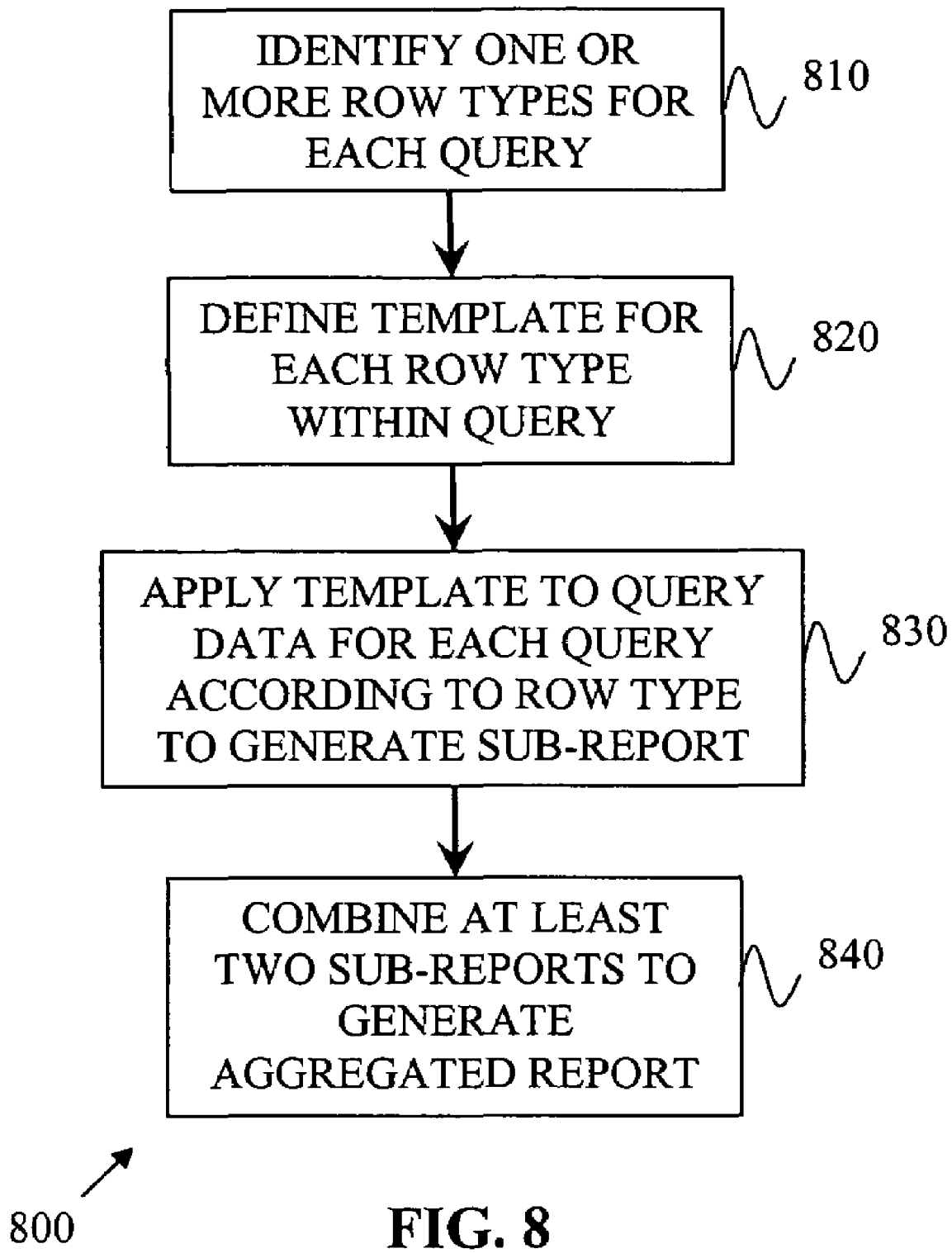
FIG. 8 illustrates a process flow diagram of a report design process to generate an aggregate report.

FIG. 8 shows a process flow diagram of a method 800 for generating a report of a plurality of business warehouse system queries. The method 800 may identify, at step 810, one or more row types for each query. Thereafter, at step 820, a template may be defined for each row type for each query. The template may in turn define a format and a pattern for the row type. The template may, at step 830, be applied to the query data for each query according to the row type to generate a sub-report. Thereafter, at step 840, at least two sub-reports may be combined to generate an aggregated report.

Figure 9:
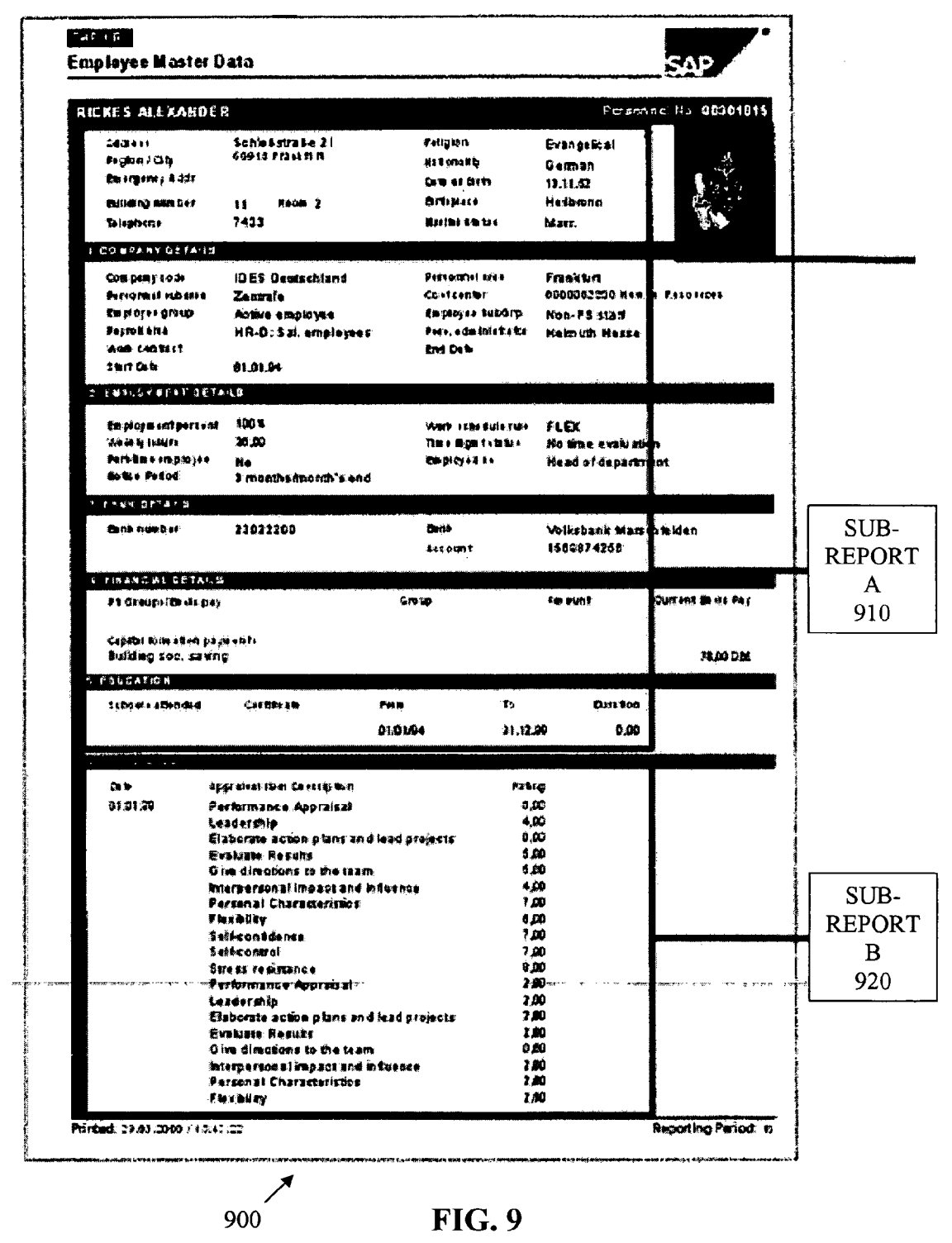

FIG. 9 illustrates a sample aggregate report 900 that includes sub-reports 910, 920 from at least two different queries. The aggregate report 900 may, for example, be generated in a fashion similar to that of a single query report as described above with the exception of including multiple queries. For example, the report 900 may contain, in a first sub-report 910, personal information pertaining to an employee, such as personal contact information, company details, employment details, bank details, financial details, education and the like based on data generated by a human resources data provider. A second sub-report 920 may contain information pertaining to performance of the employee based on data generated by a performance evaluation data provider. Data from other data providers may be obtained from a business warehouse database (or other storage device) to form other sub-reports to be integrated into the aggregate report. For example, an aggregate report 900 may comprise an employee master data sheet that aggregates all of the relevant employee information from data generated by a plurality of heterogeneous data providers.

With the illustrated variation in FIG. 9, the sub-reports 910, 920 are stacked. Optionally, if a number of columns matches for more than one sub-report 910, 920, the columns for such sub-reports 910, 920 may be aligned. If the aggregate report 900 extends over multiple pages (as defined by an application or an export or print format, etc.), page numbering may be included. Other formatting modifications may be made depending on the desired layout of each page (e.g., the report may comprise a briefing book).

The sub-reports 910, 920 may each be associated with a business warehouse query category. These categories may be used to determine in which order the sub-reports are integrated or otherwise combined into the aggregate report. Certain categories may have higher priorities than others and may be placed closer to the beginning of a report. Similarly, the placement of sub-reports 910, 920 may be manipulated by a user in a report design system or after the aggregate report has been generated (using, for example, drag and drop functions, etc.). Alternatively, the sub-reports 910, 920 may be displayed in the order in which the queries were initiated or the order in which the query results were received.

Figure 10:
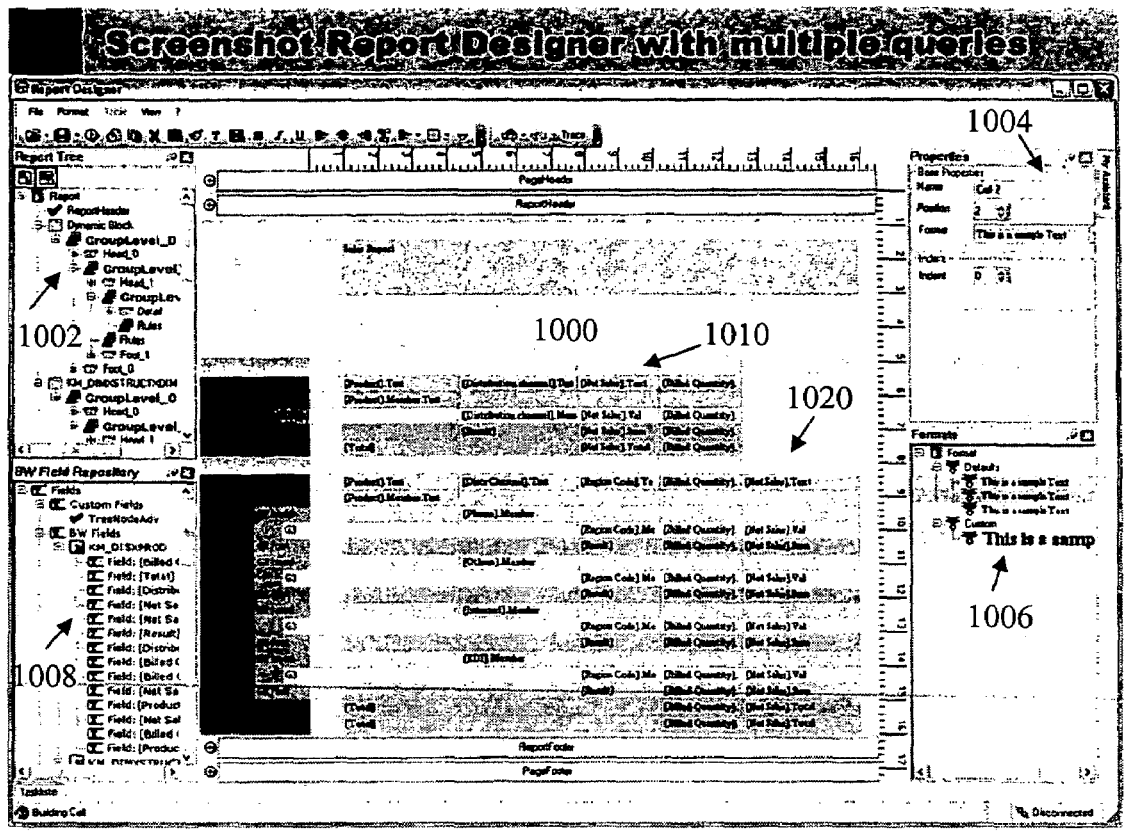
FIG. 10 illustrates a screen shot of an exemplary aggregate report designer tool.

FIG. 10 shows an exemplary screen shot of a report designer that may be used in connection with the generation of aggregate reports based on data originating from one or more business warehouse queries. The report designer includes a report template 1000 that is configurable by a user to define the formatting and layout of a single query report or an aggregate report. The report designer includes a tree 1002 listing all group level objects of two or more business warehouse queries 1010, 1020. The sub-reports 1010, 1020 may be derived from data stored within a business warehouse database and originating from disparate data providers.

The report designer may also include a properties box 1004 for selection of properties of the report rendering. The properties in the properties box 1004 may be applied to the report template by a drag and drop function. The report designer may further include a format box 1006 representing the various formatting objects that may be applied to individual cells an aggregate report. The formatting objects may also be applied to the report template using a drag and drop function. In addition, the placement of the sub-reports 1010, 1020 may be modified by a user using, for example, a drag and drop function. In one variation, the report designer includes a field repository 1008 to recover data in fields that have been deleted.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. The logic flow depicted in FIGS. 2 and 8 do not require the particular order shown, or sequential order, to achieve desirable results. Other variations may be within the scope of the following claims.

What is claimed is:

1. A computer-implemented method comprising:
   initiating a plurality of business warehouse system queries;
   associating each type of query with a category;
   during runtime of each query, identifying one or more row types for each query, and defining a template for each row type within a query from the identified row types, the template defining a format and a pattern for the row type;
   applying the template to query data for each query according to the row type to generate a sub-report;
   combining at least two sub-reports to generate an aggregated report, the sub-reports being positioned relative to each other within the aggregated report based on the associated category; and
   displaying the aggregated report.

2. A method as in claim 1, further comprising:
   reordering the sub-reports within the aggregated report.

3. A method as in claim 1, further comprising:
   generating a plurality of business warehouse system queries from a plurality of heterogeneous data providers.

4. A method as in claim 1, further comprising aligning columns within each of sub-reports.

5. A method as in claim 1, further comprising identifying one or more structural elements of the query, wherein the one or more structural elements comprise a dimension, a structure, and a hierarchy.

6. A method as in claim 5, further comprising identifying combinations of structural elements, wherein the combinations of structural elements comprise any of dimension, structure, and hierarchy.

7. A method as in claim 6, wherein the identifying of one or more structural elements of the query comprises extracting data from the query.

8. A method as in claim 7, further comprising:
associating the one or more structural elements of the query with the template; and
generating the aggregated report according to the template.

9. A method as in claim 8, further comprising:
rendering the aggregated report in a display; and
exporting the aggregated report.

10. A method as in claim 1, wherein there a plurality of queries and a plurality of aggregated reports, wherein each aggregated report comprises a number of rows and a number of columns, each intersection of a row and a column comprising a cell, and each of the queries being a query of a selection of data at a data provider where there is at least a one to one relationship between the plurality of queries and a plurality of data providers and each of the data providers provides data in a different format such that formats of the data providers are incompatible for a single query.

11. A system for generating a report of a plurality of business warehouse system queries, the system comprising:
a database to store business warehouse data from a plurality of heterogeneous data providers;
a computing system to execute a report designer program, the report designer program
being responsive to user input from an input device, to:
associate each query with a category; identify one or more row types for each query;
define a template for each row type from the identified row types, wherein the template defines a format and a pattern for the row type;
apply the template to query data for each query according to the row type to generate a sub-report; and
combine at least two sub-reports to generate an aggregate report based on two or more queries, the sub-reports being positioned relative to each other within the aggregated report based on the associated category; and
a display, coupled to the computing system, configured to display the aggregated report.

12. A system as in claim 11, wherein the report designer program is configured to be delivered from a website, wherein the report designer program is further configured to be stored on a client computer.

13. A system as in claim 12, wherein the report designer program is operable to use a graphical user interface to generate one or more reports.

14. A system as in claim 13, wherein the template is configured to define user-selectable formatting and layout of the report based on one or more sub-reports.

15. A system as in claim 14, wherein the report designer program is configured to define rules for one or more data objects in the report.

16. A system as in claim 14, wherein the report designer program comprises one or more drag and drop functions for one or more formats to be applied to the template.

17. A system as in claim 16, wherein the one or more drag and drop functions comprise any of a property box to select properties of a report rendering and a format box to represent one or more formatting objects to be applied to individual cells or rows of the report.

18. A computer program product, stored on a tangible machine-readable medium, the computer program product comprising instructions operable to cause data processing apparatus to:
design, by the data processing apparatus, a report of a plurality of business warehouse queries comprising:
for each query:
associate the query with a category; identify a row type for a row or a row group in a report; define a row pattern template for each row type;
identify one or more structural elements of the query, wherein the one or more structural elements comprise a dimension, a structure, and a hierarchy;
associate a structural template for each of the one or more structural elements;
and
render a sub-report associated with the query according to one or more templates, wherein the one or more templates comprise any of the row pattern template and the structural template; and
combine, by the data processing apparatus, each of the sub-reports to generate an aggregated report, the sub-reports being positioned relative to each other within the aggregated report based on the associated category; and
display the aggregated sub-report.

19. A computer program as in claim 18, wherein the design of the report further comprises exporting the rendered report.

20. A computer program as in claim 18, wherein the row pattern template is defined at runtime.

* * * * *

UNITED STATES PATENT AND TRADEMARK OFFICE
CERTIFICATE OF CORRECTION

| | | |
|---|---|---|
| PATENT NO. | : 7,613,688 B2 | Page 1 of 1 |
| APPLICATION NO. | : 11/069143 | |
| DATED | : November 3, 2009 | |
| INVENTOR(S) | : Wiest et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 586 days.

Signed and Sealed this

Nineteenth Day of October, 2010

David J. Kappos
*Director of the United States Patent and Trademark Office*